July 9, 1940. H. E. SATRE Re. 21,506
BORING AND DUMPING AUGER
Original Filed May 5, 1934 2 Sheets-Sheet 1
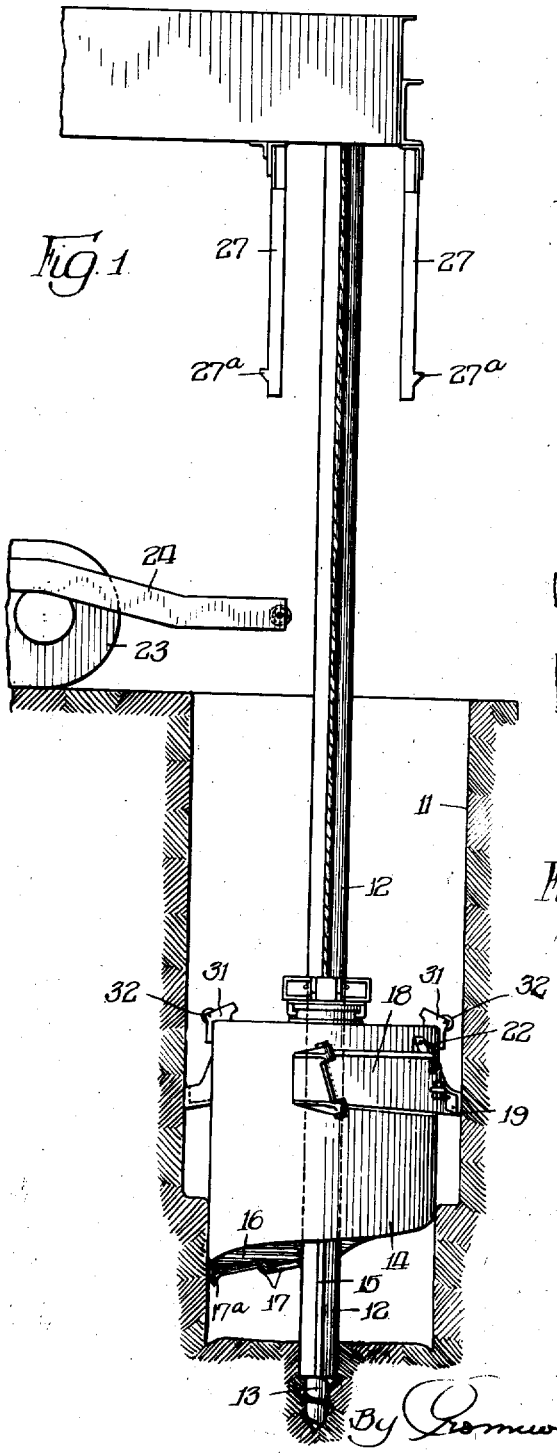
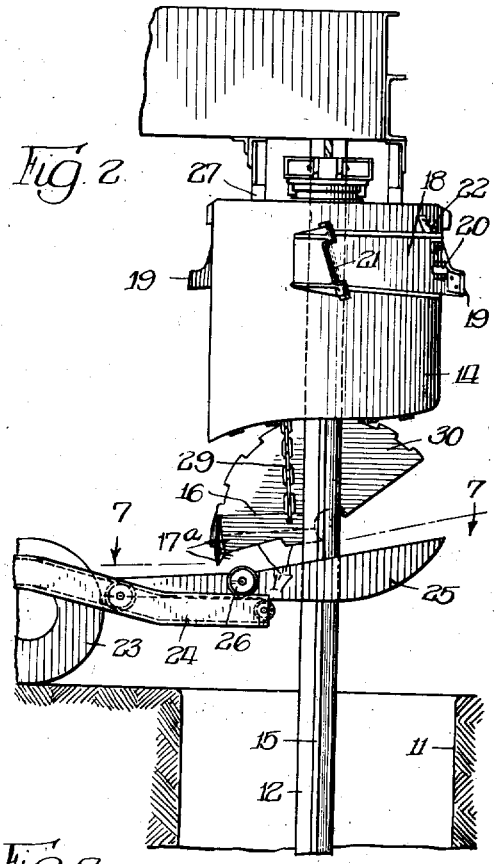
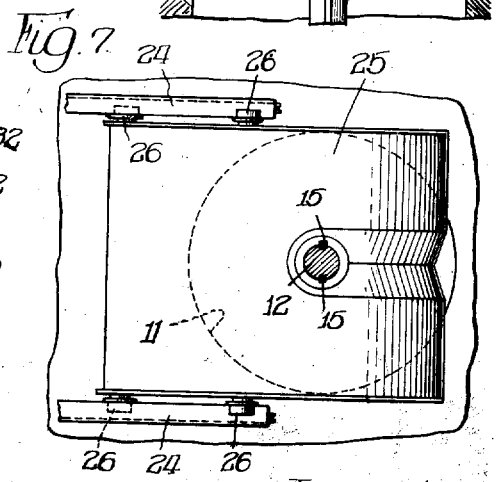
Inventor:
Hilmar E. Satre,
By Cromwell, Greist & Warden,
Attys.

BORING AND DUMPING AUGER

Original Filed May 5, 1934 2 Sheets-Sheet 2.

Inventor:
Hilmar E. Satre,
By Cromwell, Freistwarden
Attys.

Reissued July 9, 1940

Re. 21,506

UNITED STATES PATENT OFFICE 21,506

BORING AND DUMPING AUGER

Hilmar E. Satre, Chicago, Ill., assignor to First Caisson Machinery & Boring Co., Chicago, Ill., a corporation of Illinois Original No. 1,997,313, dated April 9, 1935, Serial No. 724,128, May 5, 1934. Application for reissue March 29, 1937, Serial No. 134,560

8 Claims. (Cl. 255—68)

The present invention relates to that type of boring auger adapted to the excavating of deep holes for the reception of concrete in the construction of piling, etc., and has particular reference to the excavating auger and cooperating means for discharging the auger of its load of excavated material.

The principal object of the invention to which the several parts contribute is the coordination and interrelation of the elements by which the earth is dug, hoisted and discharged, all automatically functioning in proper sequence without interruption.

The specific conveying apparatus for bearing away the dumped excavated material forms the subject matter of my Patent No. 2,001,503, issued May 14, 1935.

A preferred embodiment of the invention is hereinafter described in detail, the said description being predicated upon the accompanying drawings, wherein Fig. 1 is a vertical section through the hole being dug, showing the auger bucket with its lead and drive shaft and trip in side elevation near the bottom of the hole;

Fig. 2 is a similar view with the auger bucket in elevated position for dumping;

Fig. 7 is a fragmentary top plan as viewed from the line 7—7 of Fig. 2.

Figure 3:
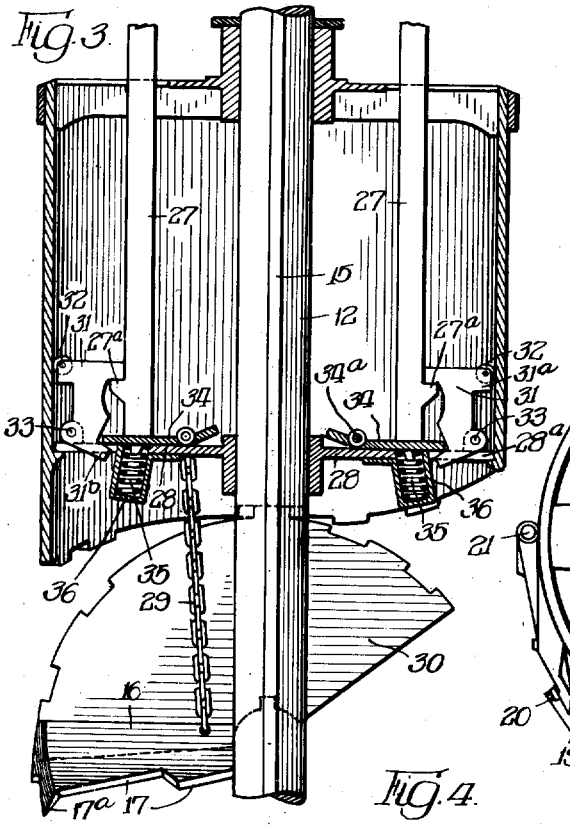
Fig. 3 is a vertical section through the auger in dumping position.
Figure 5:
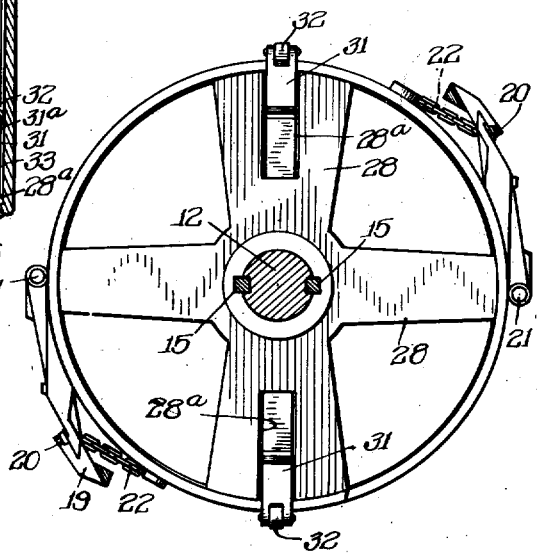
Fig. 5 is a top plan view of the auger in the position shown in Fig. 4.

It will be obvious that the invention is susceptible of embodiment in modified structural forms without departure from the essential features thereof, wherefore the description and the drawings are to be taken in an illustrative rather than in a limiting sense.

Having reference to Fig. 1 of the drawings the excavation is illustrated at 11 with the lead drive shaft axially disposed at 12 with its bit 13 in engagement with the earth. The boring auger bucket 14 is shown near the bottom of the shaft ascending or descending. The auger bucket is of the rotary type driven by splined engagement with the rib 15 of the lead shaft 12 upon which it is guided vertically.

The auger is hollow and is provided at the bottom with hinged doors carrying marginal portions 16 provided with cutting edges 17 and also one or more with side doors 18 provided with side cutters or reamers 19 which project beyond the side of the bucket and are renewably and adjustably mounted upon doors at 20. The doors themselves are mounted upon hinges 21 disposed at an angle to the vertical whereby the tendency of the doors and their cutting edges is to swing outward to the extent permitted by the limiting chains 22.

In operation, the weight of the bucket serves to dig by means of the cutters 17 into the earth at the bottom of the hole, it being noted that the cutters are provided at their outer corners with downwardly extending clearing bits 17*a* by means of which the diameter of the excavation is well defined.

Figure 4:
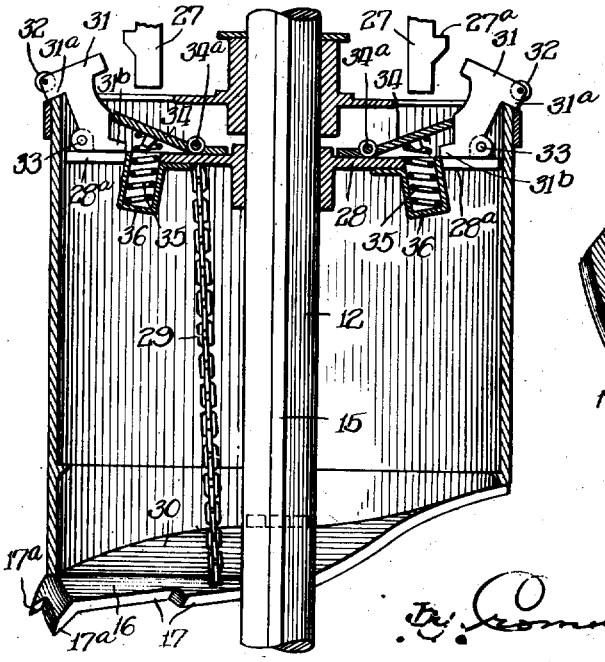
Fig. 4 is a vertical section through the auger after dumping and ready to descend for further digging.
Figure 6:
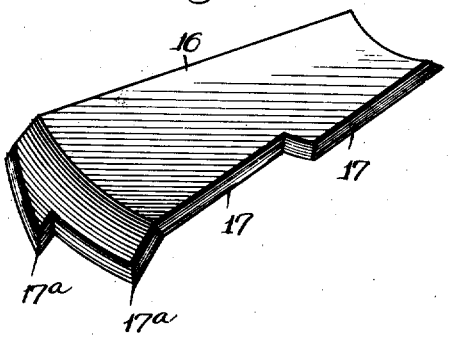
Fig. 6 is a detail in perspective of the lower cutting element of the auger.

Inasmuch as the cutters in their digging position as illustrated in Figs. 1 and 4 present an open mouth above the downwardly and forwardly inclined cutting edges, the excavated material is fed through such mouth into the interior of the bucket. At the same time the material from the side cutters or reamers 19 is fed through the mouth formed between the partially open door and the reamers 19, it being noted that these side cutters excavate beyond the bottom cutters, thus providing a space within which a liner of any suitable construction may be positioned above the side cutters.

The auger bucket having become filled, the shaft 12 is given a slight movement in a counter direction whereby the side cutters 19 are retracted sufficiently not to bite into the walls and tne auger bucket is concurrently elevated along the shaft 12.

The rear end of conveyor mechanism is illustrated in Figs. 1 and 2 as including tractor members 23 and a frame 24 bifurcated at the end as most clearly shown in Fig. 7. This bifurcated end of the frame extends above the hole to a point near the lead shaft 12 and the frame supports a traveling car or skip 25 including wheels 26 which ride upon the frame.

During the digging operation and at the time the auger bucket is ascending the car is withdrawn from the rear end of the conveyor frame delivering a load of material previously discharged therein so that the ascending auger bucket can pass between the bifurcated ends of the conveyor frame as indicated in Fig. 7.

Immediately thereafter the car assumes the position on the frame above the opening and beneath the auger bucket as illustrated in Fig. 2. Above the bucket in line on each side of the lead shaft 12 are disposed in fixed position a pair of abutment triggers 27, the purpose of which will be later described.

Interiorly of the auger bucket is slidably mounted a follower plate 28 which occupies a position above the load of excavated material within the auger.

This plate is attached by means of a chain 29 with one or more half doors 30 whereby the doors with their cutting edges may be raised or lowered.

The follower plate 28 is held in its elevated position by engagement with detents 31 on both sides thereof having noses 31*a* taking over the upper edge of the bucket as illustrated in Fig. 4. These noses are equipped with rollers 32 for a purpose hereafter made clear. The detents 31 are pivoted at 33 to the plate 28 above slots 28*a* in said plate and each has a second nose 31*b* underlying a sear 34 which engages the detent and holds the same in overhanging engagement with the upper edge of the bucket. These sears 34 are held in operative engagement with the detents 31 by means of coil springs 35 seated in pockets 36.

The skip car 25 having assumed a position beneath the auger bucket 14, the continued upward movement of the auger causes the abutment triggers 27 to engage the sears 34 and to press the same downwardly against the tension of the springs 35 thereby causing the outer ends of the sears to ride downwardly of the detents 31 and to engage the noses 31*b* tripping the detents about the pivots 33 and freeing the nose 31*a* from the edge of the bucket. The weight of the excavated material upon the door 30 and the continued upward movement of the bucket against the trigger abutments 27 causes the door to swing downwardly to an open position as represented in Fig. 3, dumping the load of material in the skip car 25. Thereupon the car 25 is moved by the conveyor to the left away from beneath the bucket and the latter begins its movement in a lowering direction.

As the auger bucket descends from the position shown in Fig. 3 the hooks 27*a* on the trigger abutments 27 lift the follower plate by means of the detents 31 which are held in the position shown in Fig. 3 by engagement of the rollers 32 with the inside wall of the auger, thus progressively closing the door 30 by means of the chain 29 until simultaneously when the door has reached the closed position the noses 31*a* of the detents 31 reach the open top of the bucket and snap over the edge thereof in the position shown in Fig. 4.

Thus it will be seen that as the auger bucket approaches the upward limit of its travel the skip car is positioned beneath the same and as the auger bucket reaches its upward limit the door is released by the trigger abutments 27 and opened by the weight of the material therein under compulsion also of the follower plate 28, which follower plate also acts to clean out the inside of the auger shell. The load of material is deposited in the skip car and as it moves away and the auger bucket begins to descend, the door is closed and the follower plate elevated to the top of the bucket by the hooks 27*a*. Thereafter the bucket continues its descent to the zone of operations and the renewed rotation of the lead shaft 12 results in a renewal of the digging operation.

I claim:

1. An excavating and dumping auger comprising a hollow shell with cutters at its bottom and having associated with its bottom cutters a door, a follower member movable within the shell and operatively connected to the door, latch mechanism for holding the follower in place in the upper part of the shell with the door closed when the auger is in lowered excavating position, a plunger device fixed above and in line with the latch mechanism and arranged when the filled auger reaches an elevated dumping position to trip the latch mechanism and cause the follower to release the door and discharge the contents and as the empty shell is lowered to restore the follower and with it the door to closed latched position.

2. An excavating and dumping auger comprising a substantially cylindrical hollow shell with cutters at its bottom and sides and having associated with its bottom cutters a hinged door, a follower plate member slidably movable within the shell above and operatively detached from the door, a pair of latch mechanisms comprising a detent and a sear acting thereon for holding the follower in place in the upper part of the shell with the door closed when the auger is in lowered excavating position, a trigger device comprising a pair of rods fixed above and in line with the latch mechanisms and arranged when the filled auger reaches an elevated dumping position to trip the latch mechanisms and cause the follower plate to descend and release the door and discharge the contents and as the empty shell is lowered to restore the follower plate and with it the hinged door to closed latched position.

3. An excavating and dumping auger comprising a hollow shell with cutters at its bottom and having associated with its bottom cutters a door, a follower member movable within the shell and operatively connected to the door, latch mechanism for holding the follower in place in the upper part of the shell with the door closed when the auger is in lowered excavating position, a plunger device fixed above and in line with the latch mechanism and arranged when the filled auger reaches an elevated dumping position to trip the latch mechanism and cause the follower to release the door and discharge the contents and as the empty shell is lowered to restore the follower and with it the door to closed latched position, in combination with a guiding and driving shaft splined to the auger shell for relative axial movement only.

4. An excavating and dumping auger comprising a substantially cylindrical hollow shell with cutters at its bottom and sides and having associated with its bottom cutters a hinged door, a follower plate member slidably movable within the shell above and operatively detached from the door, a pair of latch mechanisms comprising a detent and a sear acting thereon for holding the follower in place in the upper part of the shell with the door closed when the auger is in lowered excavating position, a trigger device comprising a pair of rods fixed above and in line with the latch mechanisms and arranged when the filled auger reaches an elevated dumping position to trip the latch mechanisms and cause the follower plate to descend and release the door and discharge the contents and as the empty shell is lowered to restore the follower plate and with it the hinged door to closed latched position, in combination with means comprising a conveyor shiftable to a position below and away from the elevated auger for receiving and transporting the excavated material.

5. An excavating and dumping auger comprising a substantially cylindrical hollow shell with a door at its bottom marginally provided with serrated cutting edges, those serrations adjacent the outer end of the cutting edges projecting downwardly and outwardly beyond the general line of the inner serrations.

6. An excavating and dumping auger comprising a substantially cylindrical hollow shell with a door at its bottom marginally provided with serrated cutting edges, those serrations adjacent the outer end of the cutting edges projecting downwardly and outwardly beyond the general line of the inner serrations, the auger also provided with a side door opening outwardly and having adjustably mounted thereon a reaming cutter, the outward swing of the side door and cutter adjustably controlled.

7. An excavating and dumping auger comprising a hollow shell with cutters at its bottom and having associated with its bottom cutters a door, a follower member movable within the shell and operatively connected to the door, latch mechanism for holding the follower out of operation with the door closed when the auger is in lowered excavating position, a device arranged when the filled auger reaches a dumping position to contact and trip the latch mechanism and cause the follower to release the door and discharge the contents and as the empty shell is lowered to restore the follower and with it the door to closed latched position.

8. An excavating and dumping auger comprising a substantially cylindrical hollow shell with a door at its bottom marginally provided with serrated cutting edges, those serrations adjacent the outer end of the cutting edges projecting downwardly and outwardly beyond the general line of the inner serrations, the auger also provided with a side door opening outwardly and having thereon a reaming cutter, the outward swing of the side door with the reaming cutter adjustably controlled.

HILMAR E. SATRE.